(12) United States Patent
Speidel

(10) Patent No.: US 9,381,669 B2
(45) Date of Patent: Jul. 5, 2016

(54) DEVICE AND METHOD FOR ELUTRIATING AND GLUING WOOD CHIPS

(75) Inventor: Hannes Speidel, Neftenbach (CH)

(73) Assignee: Kronoplus Technical AG, Niederteufen (CH)

( * ) Notice: Subject to any disclaimer, the term of this patent is extended or adjusted under 35 U.S.C. 154(b) by 37 days.

(21) Appl. No.: 13/995,370

(22) PCT Filed: Dec. 23, 2010

(86) PCT No.: PCT/EP2010/007906
§ 371 (c)(1),
(2), (4) Date: Jun. 18, 2013

(87) PCT Pub. No.: WO2012/083994
PCT Pub. Date: Jun. 28, 2012

(65) Prior Publication Data
US 2013/0276951 A1    Oct. 24, 2013

(51) Int. Cl.
*B27N 1/02*        (2006.01)
*B27N 3/02*        (2006.01)
(Continued)

(52) U.S. Cl.
CPC . *B27N 3/00* (2013.01); *B01F 5/205* (2013.01); *B07B 4/02* (2013.01); *B27N 1/02* (2013.01); *B27N 1/029* (2013.01); *B27N 1/0263* (2013.01); *B27N 3/02* (2013.01); *B27N 3/04* (2013.01); *B27N 3/14* (2013.01); *B32B 21/02* (2013.01);
(Continued)

(58) Field of Classification Search
CPC ...... B27N 1/02; B27N 1/0254; B27N 1/0263; B27N 1/029; B27N 3/02; B27N 3/04; B27N 3/08; B27N 3/14; B01F 5/205; B01F 5/225; B07B 4/02; B07B 11/00; B07B 11/02; B07B 11/06; B32B 21/02; B32B 21/042; B32B 21/13
USPC .......... 156/62.2; 264/112, 113, 121; 209/134, 209/135, 136, 137
See application file for complete search history.

(56) References Cited

U.S. PATENT DOCUMENTS 2,255,206 A * 9/1941 Duncan ........................... 65/506
3,028,287 A * 4/1962 Greten .......................... 264/121
(Continued)

FOREIGN PATENT DOCUMENTS

CH       501492 A *   1/1971
CN     1154272 A      7/1997
(Continued)

OTHER PUBLICATIONS

Communication dated Aug. 8, 2014 from the State Intellectual Property Office of People's Republic of China in counterpart application No. 201080070922.X.
(Continued)

Primary Examiner — Michael Tolin
(74) Attorney, Agent, or Firm — Sughrue Mion, PLLC

(57) ABSTRACT

A device and method for elutriating and gluing wood chips. At least one elutriating apparatus is used to fractionate the wood chips into at least one coarse chip fraction and one fine chip fraction. The elutriating apparatus has a fall duct and is designed so that the chip fractions pass through different gluing regions in the fall duct. At least one gluing apparatus is provided in order to glue the chip fractions in the gluing regions. Thus, the chip fractions can be glued in a common apparatus specifically with a glue amount adapted to a particular average chip size.

24 Claims, 2 Drawing Sheets

Figure 1:
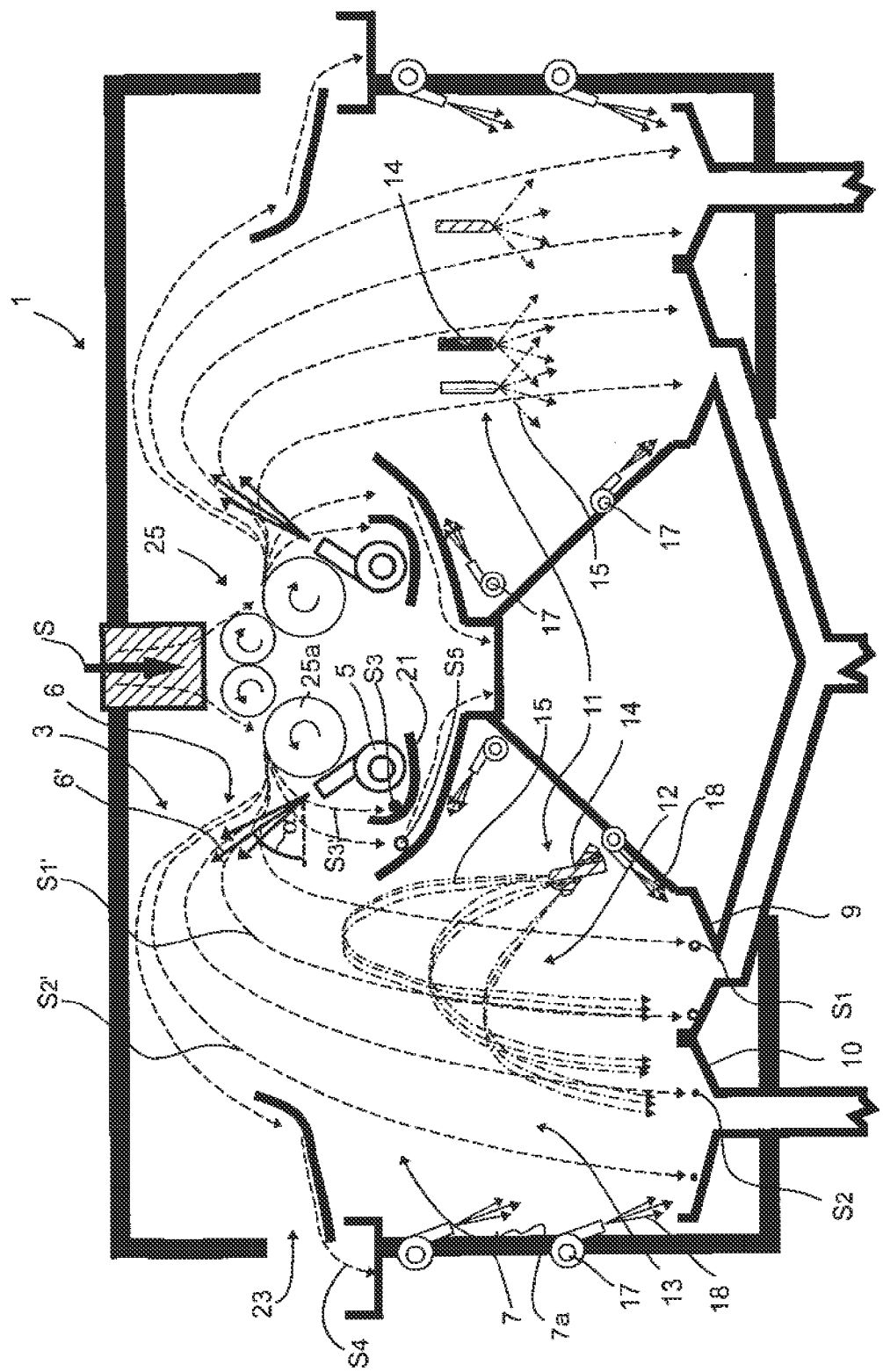

(51) Int. Cl.
  *B27N 3/04* (2006.01)
  *B27N 3/14* (2006.01)
  *B32B 21/02* (2006.01)
  *B32B 21/13* (2006.01)
  *B27N 3/00* (2006.01)
  *B01F 5/20* (2006.01)
  *B07B 4/02* (2006.01)
  *B32B 21/04* (2006.01)

(52) U.S. Cl.
  CPC ............... *B32B 21/042* (2013.01); *B32B 21/13* (2013.01); *Y10T 156/15* (2015.01)

(56) References Cited

U.S. PATENT DOCUMENTS

| | | | | |
|---|---|---|---|---|
| 3,098,781 | A | * | 7/1963 | Greten .......................... 209/134 |
| 3,308,218 | A | * | 3/1967 | Wiegand et al. .............. 264/121 |
| 6,984,266 | B2 | * | 1/2006 | Buchholzer .................. 118/303 |
| 7,328,808 | B2 | * | 2/2008 | Kokko .......................... 209/639 |
| 2002/0175113 | A1 | * | 11/2002 | Tahkanen ...................... 209/639 |
| 2009/0211692 | A1 | | 8/2009 | Krebs et al. |

FOREIGN PATENT DOCUMENTS

| | | |
|---|---|---|
| CN | 1234335 A | 11/1999 |
| CN | 1421365 A | 6/2003 |
| DE | 3319981 A1 | 12/1984 |
| DE | 198-35-419 A1 | 2/2000 |
| DE | 10-2004-033777 A1 | 2/2006 |
| DE | 10-2006-040044 B3 | 6/2007 |
| DE | 10-2006-058625 B3 | 6/2008 |
| DE | 10-2007-049948 A1 | 8/2009 |
| GB | 1154551 A | 6/1969 |

OTHER PUBLICATIONS

International Search Report for PCT/EP2010/007906, dated May 10, 2011.

* cited by examiner

DEVICE AND METHOD FOR ELUTRIATING AND GLUING WOOD CHIPS

CROSS REFERENCE TO RELATED APPLICATIONS

This application is a National Stage of International Application No. PCT/EP2010/007906 filed Dec. 23, 2010, the contents of which are incorporated herein by reference in their entirety.

The invention relates to an apparatus and method for air-separating (elutriating) and gluing wood chips.

Particle boards of wood or similar lignocellulosic materials, in particular flat press boards, are preferably made as multi-layer boards with a mechanically stabilizing middle layer of relatively coarse chips and upper and lower cover layers of relatively fine chips. Here the chips are in a relatively broad distribution of sizes, unlike the finer wood fibers used in fiber boards, such as MDF boards.

When gluing together coarse and fine chips there is the problem that due to their larger specific surface area fine chips tend to absorb more glue than necessary, while coarse chips absorb too little. This causes an undesirable uneven distribution of the amount of glue in the extruded multilayer board. In addition, a reduction in the amount of glue used for this purpose would be desirable for efficiency reasons.

As an alternative to joint gluing, DE 10 2004 033 77 A1 describes a process in which a stream of coarse fiber fractions and a stream of fine fiber fractions are first glued separately, then joined in a defined mixing ratio, and finally spread to form a flat mat. Depending on the set mixing ratio the middle and cover layers of particle board, for example of oriented strand board (OSB), can be layered one on top of the other. The disadvantage here is that separate gluing devices are required for the gluing of the individual chip fractions, as well as air-separating devices for the supplied and the finished glued chips.

There is therefore a need for an apparatus and method for providing glued wood particle fractions with different chip sizes, which are improved with respect to the aforementioned problems.

Accordingly, the inventive apparatus comprises an air-separating device to fractionate the wood chips into at least a coarse and a fine chip fraction, wherein the air-separating device comprises at least one fall duct and is configured in such a way that the coarse and the fine chip fractions pass through different gluing regions. Further, a gluing device is provided for gluing the coarse and fine chip fractions in the gluing regions. In particular, the coarse chip fraction has a larger average chip size than the fine chip fraction. The gluing regions are provided in particular in the area of the fall duct.

The different gluing regions in the fall duct are provided, for example, by deflecting the chip fractions of different chip sizes during the air separation to the side by different amounts first, so that in a subsequent phase of falling the chip fractions are spatially separated from each other. With the gluing device different conditions for gluing can be provided in the gluing regions in order to adapt the glue absorption of the individual chip fractions to a desired amount. Thus it is possible to jointly air-separate and glue chip fractions of at least two different fineness levels in a common apparatus and to set the glue amount separately for the middle and cover layers of a press board.

Preferably, the gluing device is configured to introduce at least one glue aerosol in the gluing regions so that at least along one sorting path passed through by the coarse chip fraction a different amount of glue is provided, in particular, a greater amount of glue, than along at least one sorting path passed through by the fine chip fraction. The sorting path here is the trajectory of the individual chip particles during air separation, for example consisting of a phase of particle deflection and a subsequent phase of falling down of the particles. Glue amount indicates an undiluted amount of glue with which a particle of a uniform size would come into contact on its path through its respective gluing region, i.e. along its sorting path. The amount of glue is therefore particularly dependent on the glue density along the sorting path and the length of the sorting path within the gluing region.

In a particularly advantageous embodiment, the gluing device is configured to introduce into the gluing regions at least one glue aerosol so that the average glue density differs in the various gluing regions. Glue density here means the weight or the volume of the glue per unit volume of the gluing regions. For glue aerosols different glue densities can be produced by introducing different glue volume flows, for example from spray nozzles staggered at different densities or the like, and/or with glue drops of different sizes. Another option could be atomizing different highly concentrated or diluted glue. This allows to easily adjust the glue amount absorbed by each of the chip fractions in the gluing regions.

For example, glue aerosols could be introduced into the gluing regions for which the average glue density is chosen according to the principle that the greater the average chip size of the chip fraction associated with the gluing region, the greater the average glue density. This would avoid in particular that fine chip fractions with a relatively large specific surface area absorb too much glue and coarse chip fractions with a relatively small specific surface area absorb too little glue. Thus, the total quantity of glue required for the production of particle boards will be reduced and the profitability increased. In addition, this allows a homogeneous distribution of glue in the individual chip fractions and in relation of the individual chip fractions to each other.

Preferably, the air-separating device includes at least one blowing device for generating a deflecting flow pointing upward at an angle, the main flow direction of the deflecting flow including, in particular, an angle of 30 to 60° with the horizontal plane. Thus, the chip fractions, which substantially follow the course of a parabolic trajectory, may be separated in the following fall duct, which allows to provide different gluing regions in a particularly simple manner. With main flow directions of 30 to 60° a particularly compact construction can be implemented since the trajectories of coarse and fine particles in this angle range differ widely and allow a particularly effective separation. Furthermore, chip fractions which should not be glued can be separated especially effectively from the chip fractions to be glued.

In a particularly advantageous embodiment of the inventive apparatus, on the air-separating device upstream of the gluing regions a collection device for foreign matter is provided, the density of which is greater than the density of the chips supplied, and/or a collection device for a chip fraction not to be glued, which is coarser than the chip fractions to be glued, and/or a collection device for a chip fraction not to be glued, which is finer than the chip fractions to be glued. This allows wood chip impurities such as sand, stones or metal parts to be removed and to be very easily disposed of in an unglued state. In addition, very light chip fractions, such as wood dust, can be removed before gluing and can be used for further utilization, for example for the production of energy and/or thermal oil. This allows a considerable conservation of resources and/or an improved utilization of chips. Furthermore, too coarse chip fractions can be removed in unglued state for subsequent recycling, for example, by shredding and recycling into the product stream. This facilitates the handling and subsequent recovery of the removed fractions. Furthermore, it can be avoided to use glue unnecessarily for chip fractions that will be utilized in some other way.

A particularly advantageous embodiment further includes at least one collection device for separately collecting the glued chip fractions. This can easily provide the chip fractions separated in the air separation for further processing. As a result, additional devices for air-separating the chips become unnecessary.

A particularly advantageous embodiment of the invention further comprises at least one further blowing device for generating a guard flow along at least one side wall of the fall duct to direct the glued chip fractions and/or the glue aerosols away from the side wall. This allows to avoid contamination of the inventive apparatus with glue or to at least reduce it. In addition, the contact of the abrasive wood chips with the inventive apparatus can be avoided or at least reduced. In other words, the air separation and gluing of the chip fractions occur substantially without the contact of machine parts, so that these are loaded as little as possible with glue and/or chips. This allows the reduction of the wear of the inventive apparatus and of the need to clean it with the consequence of a temporary production standstill.

Preferably, the collection device comprises at least one conveyor belt in such a way that at least the coarse and the fine chip fraction fall in the conveying direction of the conveyor belt in succession and are layered on the conveyor belt one on top of the other and provided for further processing. This renders an additional means for layering the chip fractions unnecessary. Consequently multi-layer chipboards can be produced with a very low space requirement.

In another aspect, the present invention provides a method wherein the wood chips are separated by air separation into at least two chip fractions of different average chip size, and the chip fractions are glued during air separation. Thus, the chip fractions can be separated and glued in a common treatment unit without touching sensitive machine parts. For this purpose a phase of falling of the chip fractions at the end of air separation is particularly suitable. Since the coarse and the fine fraction are present in separate areas during or after air separation, the gluing of the respective chip fraction can be easily adapted to the particular average particle size and/or the average particle surface.

Preferably, the chip fractions are glued with glue aerosols of different glue density, in particular wherein the chip fractions are glued with even greater glue density, the coarser the chip fraction. Glue aerosols of different glue density mean a distribution of the glue in the form of glue aerosols with a different amount of glue per unit volume of the gluing regions. That is, the glue could be provided in the form of differently sized drops of glue, a different number of drops of glue and/or aerosols with different glue concentration.

In a particularly advantageous embodiment, the chip fractions are glued with different glue densities by spraying of differently highly diluted glue. In this way, different glue densities can be particularly easily and flexibly produced. For example glue concentrations could be continuously adjusted to the chip fractions that are momentarily present.

Preferably, the chip fractions are deflected laterally to different extents by introducing a deflecting flow pointing obliquely upward, and are glued during a falling phase, in particular in a region below the deflecting flow. Thus a separation of differently fine chip fractions can be achieved in a simple way, essentially following the course of a parabolic trajectory, to glue and collect the chip fractions separately from each other.

Preferably, during the air separation at least one further chip fraction not to be glued is removed before gluing. This makes it possible to increase the quality of the chip fractions to be glued and guarantee that chip fractions not to be processed into particle boards can be supplied without glue to a further utilization. Further, in particular a too coarse chip fraction in a non-glued state for use in particle boards can be supplied to shredding and again returned to the product stream, in particular for gluing. Thus, the chip fractions can be returned in a resource-saving manner for optimum use, and the total amount of glue used can be reduced.

Preferably, the chip fractions include at least a coarse chip fraction for the production of a middle layer and a fine chip fraction for the production of at least one cover layer of a press board. In such chip fractions, the method of the invention can be used particularly efficiently. In particular, the space-saving benefits of air-separating and gluing the wood chips and adaptation of the glue amounts applied to the respective chip fractions can be combined particularly efficiently.

The object of the invention is further achieved by a manufacturing method of a press board, comprising the method of the invention and a step of stacking layers of at least one lower cover layer, the middle layer and an upper cover layer, and a step of compressing the cover layers and the middle layer. Thus, press board panels with particularly high quality can be produced particularly cost-effectively and in a resource-saving manner.

Figure 2:
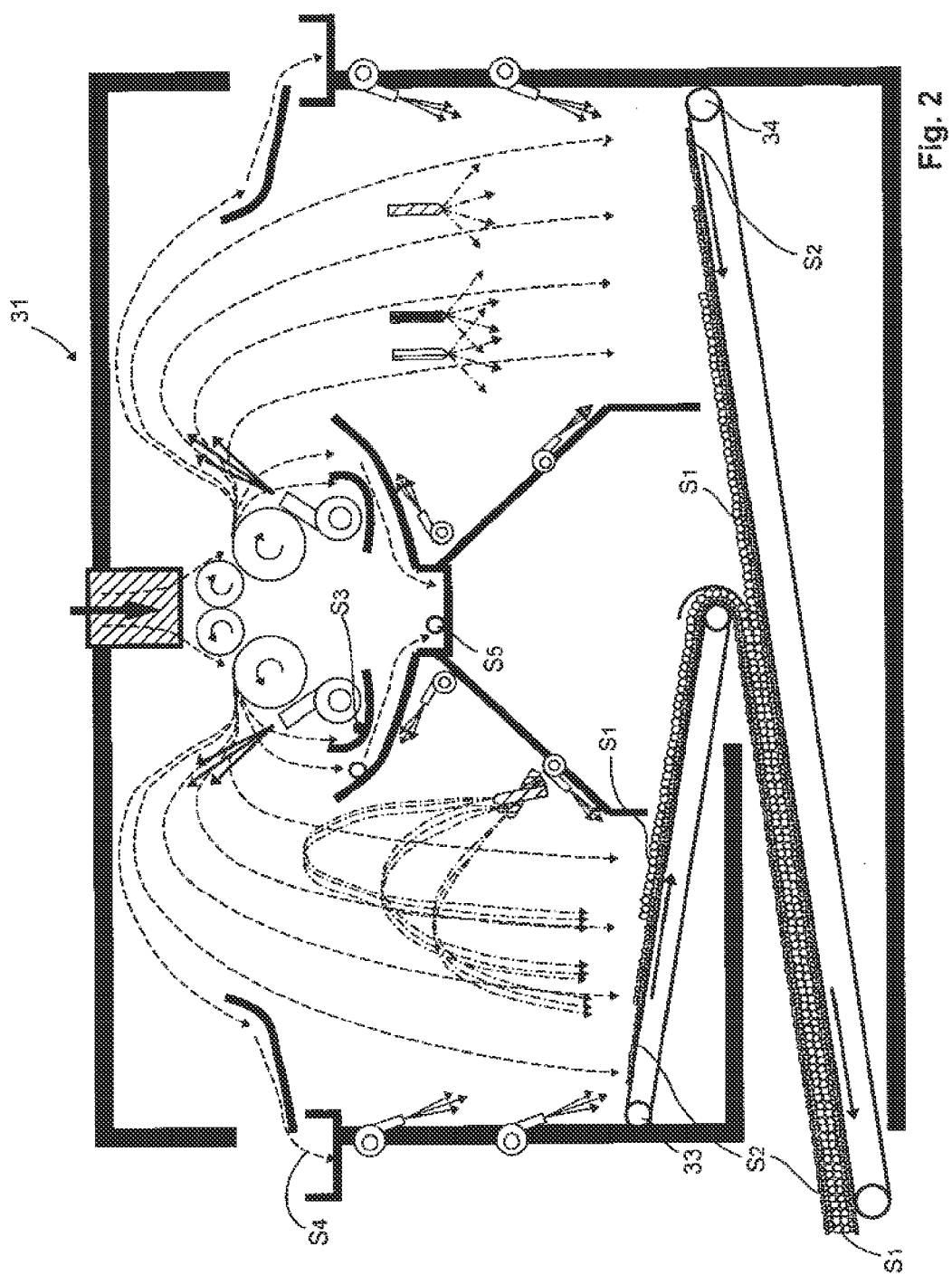

Preferred embodiments of the invention are shown in the drawings. In the drawings:

FIG. 1 shows a schematic cross section of a first embodiment of the inventive apparatus, and FIG. 2 shows a schematic cross section of a second embodiment of the inventive apparatus.

As shown in FIG. 1a first embodiment 1 of the inventive apparatus for air-separating and gluing of wood chips S or the like comprises an air-separating device 3 for fractionating the wood chips S into at least two chip fractions S1 and S2 to be glued, each chip fractions having a different average chip size.

The air-separating device 3 includes a blowing device 5, which generates a deflecting flow 6 pointing upward at an angle for lateral deflection of the wood chips S, as well as a fall duct 7, in which the deflected particles can fall down, preferably following different trajectories depending on the chip size, so that the coarser chip fraction S1 is spatially separated from the finer chip fraction S2. The chip fractions S1, S2 substantially falling down side by side along associated sorting paths S1', S2' are collected separately by a first collection device 9 for coarse chips and a second collection device 10 for fine chips for further processing.

The inventive apparatus 1 further comprises in the region of the fall duct 7 a gluing device 11 with spraying devices 14 for producing at least one glue aerosol 15, also commonly known as a spray, through which the chip fractions to be glued S1, S2 fall. The spraying devices 14 may be, for example, spray nozzles such as high pressure nozzles or ultrasonic nozzles, and/or rotary atomizers, whose basic mode of operation is known in each case and therefore is not further described. Likewise, for the purpose of atomization or nebulization in the spraying devices 14 steam can be mixed in addition to achieve a desired aerosol quality.

The gluing device 11 is configured in such a way that at least one glue aerosol 15 with locally different glue density and/or over different length segments of air-separation paths S1', S2' is provided in the gluing regions 12, 13 assigned to chip fractions S1, S2 within the fall duct 7. That is, a glue aerosol 15 is generated, for example, with a glue density gradient between the gluing regions 12, 13, or several aerosols 15 with different glue density are generated. This can for example be achieved by providing, as indicated in FIG. 1 to the left, several spray nozzles with different angles of inclination and/or, as indicated in FIG. 1 to the right, differently tightly staggered spray nozzles or the like. It would also be possible to spray from individual spraying devices 14 differently highly concentrated or diluted glue. It would of course also be possible to spray with suitable spraying devices 14 glue aerosols 15 with different average drop size and/or different number of drops per unit volume. In any case, the differently fine chip fractions S1, S2 in the gluing regions 12, 13 along the particle trajectories S1', S2' each come into contact with an aerosol glue quantity adapted to the respective chip fraction S1, S2.

Furthermore, in FIG. 1 in the area of the fall duct 7 and of the gluing device 11 an additional blowing device 17 is indicated. This includes in the example several schematically indicated decentralized blowers. It would also be conceivable, however, to have at least one central blower unit with associated air supply ducts. For reasons of simplicity the associated exhaust air lines are not shown. The additional blowing device 17 is configured to generate a guard air flow 18 along the side walls 7a of the fall duct 7, particularly in a region of aerosol gluing. This prevents the glue aerosol 15 from being deposited on the side walls 7a of the fall duct 7. It also prevents the wood chips S in the form of the chip fractions S1, S2 from colliding against the fall duct 7 or other mechanically sensitive components of the inventive apparatus 1 and from causing damage due to the known severe abrasive effect of the wood chips S. The guard flow 18 caused by the additional blowing device 17 is preferably configured such that as far as possible a laminar flow path results on the side wall 7a of the fall duct 7, to avoid unwanted turbulence and mixing of the chip fractions S1, S2 due to turbulence.

The inventive apparatus 1 preferably further comprises a third collection device 21 for foreign matter S3 to be separated from the wood chips, such as sand, stones, metal pieces and the like, which are especially heavier than the wood chips S, and a fourth collection device 23 for a light chip fraction S4 not to be glued, such as wood dust. The third and fourth collection devices 21, 23 are preferably arranged in a region of the deflecting flow 6 upstream of the gluing device 11. Thus, the foreign matter S3 and the light chip fraction S4 can be separated from the chip fractions S1, S2 to be glued and sorted out in unglued state. Thus, for example, the light chip fraction S4 can be supplied to an unlimited and environmentally friendly further utilization for burning or the like. Also, the foreign matter fraction S3 can be collected and disposed of in a particularly simple manner. It goes without saying that thanks to this configuration, in addition to the easier handling and improved utilization of the separated fractions, it is also avoided that the glue aerosol 15 is directed to the chip fractions S3, S4 that are not to be glued, so that the glue consumption can be reduced as a whole.

As shown in FIG. 1, the lighter fractions S2, S4 of the wood chips S are deflected by the air flow 6 further laterally than the heavier chip fraction S1 or the foreign matter fraction S3. In other words, for heavier and/or coarser fractions there are comparatively steeper sorting paths. Thus, the individual fractions S1 to S4 can be sorted effectively before or in the fall duct 7 by the action of the air flow 6.

It would of course be conceivable to fractionate the wood chips S even finer. They may be for instance subdivided into more than two chip fractions S1, S2 that are to be glued. Similarly, another heavy chip fraction S5 could be separated by means of the deflecting flow 6 before gluing to be recycled into the product stream. For example, a too coarse chip fraction for the manufacture of particle board in a specific quality in unglued condition could be recycled, shredded and finally added again to the wood chips S. In the non-glued condition it is particularly easy to handle the recycling of the coarse chip fraction.

The deflecting flow 6 is particularly advantageous if its main flow direction 6' encloses an angle $\alpha$ in the range 30 to 60° with the horizontal. Ideally the angle $\alpha$ of the main flow direction 6' lies in the range of 40 to 50°. Within this angle range the trajectories of single chip fractions S1, S2, S4 can be proportioned particularly favorably.

With such angles $\alpha$ relatively long trajectories arise, resulting in a more accurate, space-saving air separation. Accordingly, the gluing regions 12, 13 can be spatially separated from each other particularly well and the associated glue densities adjusted.

Although the gluing regions 12, 13 are shown in FIG. 1 spaced from each other, the gluing regions 12, 13 may also be directly adjacent to each other or overlap. Similarly, the glue density may be implemented in the form of a gradient, and continuously merge from one gluing region 12, 13 into the other. For example, the glue amount provided with at least one glue aerosol 15 per flowed through volume of the respective gluing region 12, 13 could continuously decrease from the gluing region 12 associated to the coarse chip fraction S1 to the gluing region 13 associated to the fine chip fraction S2. It is decisive here that, for different fine chip fractions S1, S2 different specific glue amounts can be provided to adapt the absorbed glue amount to a characteristic parameter of the chip fractions S1, S2, such as the volume, dimensions, and/or the surface of the particles.

For the sake of completeness in FIG. 1 dosing and/or deflection rollers 25 on input-side are indicated, whose operation is substantially known and therefore not described in detail. However, a deflection roller 25a immediately preceding the blowing device 5 is preferably configured so that the wood chips S are tossed away laterally in the direction of the deflecting flow 6 pointing obliquely upward. This allows to produce a sorting path S3' on the input side, similar to a parabolic trajectory, for heavy particles for separating the foreign matter fraction S3.

The at least one glue aerosol 15 is preferably provided in the form of a glue curtain, which crosses the sorting paths S1', S2'. Therefore it is advantageous to have a linear arrangement of the inventive apparatus 1, wherein the structures of FIG. 1 would be interpreted substantially as cross-sections of the profiles protruding into the drawing plane. However, a substantially rotationally symmetrical configuration of the apparatus 1 is also conceivable, wherein the glue aerosols 15 may then form a substantially rotationally symmetrical glue curtain. However, neither an axially symmetrical nor a rotationally symmetrical design of the inventive apparatus 1 is absolutely necessary.

FIG. 2 shows an alternative embodiment 31 of the inventive apparatus which, with the exception of the first and second collection devices 9, 10, essentially corresponds to the first embodiment 1. Identical or equivalent features are omitted from FIG. 2 for clarity and/or not labeled separately. In the second embodiment 31, in place of the funnel-shaped or ring-shaped first and second collection devices 9, 10, conveyor belts 33 and 34 are provided which also serve as collection devices and which, in addition, stack layers of the glued and collected chip fractions S1, S2 as continuous partial product streams to produce multi-layer chipboards in a particularly space-saving manner. In contrast, the chip fractions S1, S2 captured with the first embodiment 1 can be, if necessary, air-separated again and/or evenly distributed across a board surface to be produced before the stacking of layers in order to ensure very uniform layer thicknesses.

The inventive apparatus 1, 31 can be used as follows:

For the production of multi-layer chipboards suitable wood chips S, which comprise differently coarse components, are introduced as a continuous product stream into the inventive apparatus 1, 31 by the dosing rollers 25. By the deflection rollers 25*a* the wood chips S are substantially thrown in a horizontal direction towards the air flow 6, so that contained heavy foreign matter S3 falls down before the deflecting flow 6 and/or falls through it, in order to be collected by the third collection device 21 and consequently separated from the product stream.

In contrast, the wood chips S are swept obliquely upward by the deflecting flow 6. Light, fine contents S4 of the wood chips S, which are not to be glued, such as wood dust, are separated from the product stream by the fourth collection device 23 before the gluing and fed to a separate utilization, for example for energy generation.

In contrast, the chip parts to be glued, which are swept away by the air flow 6, all fall into the fall duct 7, essentially following the course of a steeper parabolic trajectory S1', S2'. The air separation by means of the air flow 6 causes the fine chip fraction S1 to be further deflected laterally than the coarse chip fraction S2. Thus, the chip fractions S1, S2 fall substantially side by side through the fall duct 7. The gluing regions 12, 13 in the fall duct 7 are limited mainly by the trajectories S1', S2' of the particles of the chip fractions S1, S2; in these gluing regions preferably different glue densities are provided by at least one suitable distributed glue aerosol 15 or by several different glue aerosols 15. While falling through the fall duct 7, in particular in the gluing regions 12, 13, the chip fractions S1, S2 each absorb a part of the glue aerosols 15, and are therefore glued when passing through the gluing regions 12, 13. The glue density of the at least one glue aerosol 15 in the gluing regions 12, 13 is preferably adapted to the average chip size of the chip fractions S1, S2. Thereby, the glue amount in the fine and coarse chip fractions S1, S2 is adjusted to a ratio of the respective average particle surface and of the average particle volume.

In the lower part of the fall duct 7, the glued chip fractions S1, S2 are collected separately by the collection device 9 and are provided for further processing to form a multi-layer particle board. The chip fractions S1, S2 can be stacked one on top of the other in a known manner as lower cover layer, middle layer and upper cover layer. It is also conceivable that the chip fractions S1, S2 or more (not shown) chip fractions are pressed into multilayer boards with a number of layers that is different from the application example shown. With the air-separated and glued chip fractions of the invention also multilayer boards with improved quality and/or in a resource-saving manner can be produced using conventional pressing devices.

The illustrated embodiments can be combined in any technically meaningful manner. In particular, different gluing devices can be combined. It is possible, for example, to produce different glue densities or glue gradients in the gluing regions 12, 13 by combining different spraying devices 14 or differently highly diluted glue aerosols 15. In particular, individual spraying devices 14 may be inclined in different tilting degrees. Also, spray nozzles and/or rotary atomizers can be arranged close to each other to different degrees. With different inclinations of spray nozzles, for example, differently shaped glue curtains can be formed from the glue aerosol 15 so that the contact areas of the glue aerosol 15 with the different fine chip fractions S1, S2 can be different in the individual gluing regions 12, 13. Here the variants of the spraying devices 14 shown in the figures and their asymmetric combination are to be understood only as schematic examples to explain the functioning.

Similarly, the separate and glued chip fractions S1, S2 can be collected and scattered into mats in layers in different ways, as indicated for example in the FIGS. 1 and 2.

The invention claimed is:

1. An apparatus for air-separating and gluing wood chips, comprising:
    an air-separating device for fractionating the wood chips into at least a coarse and a fine chip fraction, wherein the air-separating device comprises a fall duct and is configured in such a way that the coarse and the fine chip fractions pass through different gluing regions in the same fall duct; and
    a gluing device for gluing the coarse and fine chip fractions in the gluing regions within the same fall duct,
    wherein the gluing device comprises a plurality of nozzles that are arranged with different spacing between adjacent nozzles so as to generate at least one glue aerosol with a glue density gradient between the gluing regions.

2. The apparatus according to claim 1, wherein the air-separating device is configured in such a way that the coarse chip fraction follows at least a first sorting path and the fine chip fraction follows at least a second sorting path that is different from the first sorting path, and
    wherein the gluing device is configured to introduce into the gluing regions the at least one glue aerosol in such a manner that a different amount of glue is provided along the first sorting path than along the second sorting path.

3. The apparatus of claim 2, wherein the gluing device is configured to introduce the at least one glue aerosol in such a manner that a greater amount of glue is provided along the first sorting path than along the second sorting path.

4. The apparatus according to claim 1, wherein the air-separating device comprises at least one first blowing device for generating a deflecting flow pointing upward at an angle.

5. The apparatus of claim 4, wherein the deflecting flow has a main flow direction that includes an angle of 30 to 60° with the horizontal.

6. The apparatus according to claim 1, further comprising at least one collection device, the collection device being arranged on the air-separating device and upstream of the gluing regions, the collection device being configured to collect at least one of:
    foreign matter, the density of which is greater than the density of the wood chips (S);
    a first chip fraction not to be glued, which is coarser than the coarse chip fraction; and
    a second chip fraction not to be glued, which is finer than the fine chip fraction.

7. The apparatus according to claim 1, further comprising at least one collection device for separately collecting the glued chip fractions.

8. The apparatus according to claim 1, further comprising at least one second blowing device for generating a guard flow along at least one side wall of the fall duct to direct at least one of the glued chip fractions and at least one glue aerosol away from the side wall.

9. The apparatus according to claim 7, wherein the collection device for separately collecting the glued chip fractions comprises at least one conveyor belt in such a way that at least the coarse and the fine chip fraction fall onto the conveyor belt in succession with respect to a conveying direction and are provided by the conveyor belt one on top of the other for further processing.

10. The apparatus according to claim 1, wherein the nozzles are staggered with respect to a horizontal direction.

11. The apparatus according to claim 10, wherein the nozzles, when viewed along a main flow direction of the chip fractions, are arranged at different positions in the horizontal direction.

12. An apparatus for air-separating and gluing wood chips, comprising:
    an air-separating device for fractionating the wood chips into at least a coarse and a fine chip fraction, wherein the air-separating device comprises a fall duct and is configured in such a way that the coarse and the fine chip fractions pass through different gluing regions in the same fall duct; and
    a gluing device for gluing the coarse and fine chip fractions in the gluing regions within the same fall duct, wherein the gluing device comprises a plurality of nozzles that are arranged with different angles of inclination so as to generate at least one glue aerosol with a glue density gradient between the gluing regions.

13. The apparatus according to claim 12, wherein the air-separating device is configured in such a way that the coarse chip fraction follows at least a first sorting path and the fine chip fraction follows at least a second sorting path that is different from the first sorting path, and wherein the gluing device is configured to introduce into the gluing regions the at least one glue aerosol in such a manner that a different amount of glue is provided along the first sorting path than along the second sorting path.

14. The apparatus according to claim 12, wherein said nozzles are arranged with different angles of inclination with respect to a horizontal direction.

15. The apparatus according to claim 14, wherein at least one nozzle, when viewed along a main flow direction of the chips fractions, is arranged at a greater inclination in the horizontal direction than a further nozzle.

16. An apparatus for air-separating and gluing wood chips, comprising:
    an air-separating device for fractionating the wood chips into at least a coarse and a fine chip fraction, wherein the air-separating device comprises a fall duct and is configured in such a way that the coarse and the fine chip fractions pass through different gluing regions in the same fall duct; and
    a gluing device for gluing the coarse and fine chip fractions in the gluing regions within the same fall duct, wherein the gluing device comprises a plurality of nozzles that are configured to spray glue aerosols with at least one of different average drop size and different number of drops per unit volume so as to generate a plurality of glue aerosols with different glue densities between the gluing regions.

17. The apparatus according to claim 16, wherein the air-separating device is configured in such a way that the coarse chip fraction follows at least a first sorting path and the fine chip fraction follows at least a second sorting path that is different from the first sorting path, and wherein the gluing device is configured to introduce into the gluing regions the glue aerosols in such a manner that a different amount of glue is provided along the first sorting path than along the second sorting path.

18. A method for air-separating and gluing wood chips using an apparatus for air-separating and gluing wood chips that comprises an air-separating device for fractionating the wood chips into at least a coarse and a fine chip fraction, wherein the air-separating device comprises a fall duct and is configured in such a way that the coarse and the fine chip fractions pass through different gluing regions in the same fall duct, and a gluing device for gluing the coarse and fine chip fractions in the gluing regions within the same fall duct, wherein the gluing device comprises a plurality of nozzles that are arranged with different spacing between adjacent nozzles, the method comprising:
    separating the wood chips by air separation using the air-separating device into at least two differently fine chip fractions while the chip fractions pass through the fall duct; and
    gluing the chip fractions using the gluing device during the air separation while the chip fractions fall through the fall duct, wherein the chip fractions are glued with at least one glue aerosol with a glue density gradient between the gluing regions.

19. The method according to claim 18, wherein the chip fractions are glued with different density by spraying of differently highly diluted glue.

20. The method according to claim 18, wherein the chip fractions are deflected laterally to different extents by introducing a deflecting flow that points upward at an angle, and are glued during a falling phase, in particular in a region below the deflection flow.

21. The method according to claim 18, wherein during the air separation at least one further chip fraction not to be glued is removed before gluing.

22. The method according to claim 18, wherein the chip fractions comprise at least a coarse chip fraction for the production of a middle layer and a fine chip fraction for the production of at least one cover layer of a press board.

23. The method according to claim 22, further comprising a step of stacking layers of at least one lower cover layer, the middle layer and an upper cover layer, as well as a step of compressing the lower and upper cover layers and the middle layer.

24. The method of claim 18, wherein the chip fractions are glued with a glue density that is the greater the coarser the chip fraction.

* * * * *